(12) United States Patent
Ryan et al.

(10) Patent No.: US 9,656,713 B1
(45) Date of Patent: May 23, 2017

(54) TILTING PROPULSION DEVICE SAFETY MECHANISM

(71) Applicant: NOTILT, LLC, Nanuet, NY (US)

(72) Inventors: Fintan Ryan, Pearl River, NY (US); John Bennett, Nanuet, NY (US)

(73) Assignee: NOTILT, LLC, Nanuet, NY (US)

( * ) Notice: Subject to any disclaimer, the term of this patent is extended or adjusted under 35 U.S.C. 154(b) by 0 days.

(21) Appl. No.: 15/076,541

(22) Filed: Mar. 21, 2016

(51) Int. Cl.
| | |
|---|---|
| *B62J 27/00* | (2006.01) |
| *B62D 37/00* | (2006.01) |
| *B60G 17/015* | (2006.01) |
| *B60G 17/016* | (2006.01) |

(52) U.S. Cl.
CPC .......... *B62J 27/00* (2013.01); *B60G 17/0157* (2013.01); *B60G 17/0164* (2013.01); *B62D 37/00* (2013.01); *B60G 2600/07* (2013.01)

(58) Field of Classification Search
CPC .. B62J 27/00; B60G 17/0164; B60G 17/0157; B60G 2600/07; B62D 37/00
USPC .................................. 280/755, 5.502, 5.513
See application file for complete search history.

(56) References Cited

U.S. PATENT DOCUMENTS

| | | | | |
|---|---|---|---|---|
| 3,814,026 A | * | 6/1974 | Maloney | B66F 9/07559 104/120 |
| 6,050,357 A | * | 4/2000 | Staelin | A63C 17/004 180/181 |
| 6,059,062 A | * | 5/2000 | Staelin | A43B 5/16 180/181 |
| 7,083,178 B2 | | 8/2006 | Potter | |
| 8,738,278 B2 | | 5/2014 | Chen | |
| 9,126,487 B2 | | 9/2015 | Henderson et al. | |
| 2003/0006082 A1 | * | 1/2003 | Popoff | B62J 27/00 180/271 |
| 2004/0160049 A1 | * | 8/2004 | Durham | B62K 21/12 280/751 |
| 2005/0242538 A1 | * | 11/2005 | Hiramatsu | A63C 17/004 280/92 |
| 2006/0108165 A1 | * | 5/2006 | Kamen | B60L 15/2036 180/233 |
| 2008/0197615 A1 | * | 8/2008 | Connolly | B62D 25/20 280/759 |
| 2016/0136508 A1 | * | 5/2016 | Bigler | A63C 17/014 180/181 |
| 2016/0144684 A1 | * | 5/2016 | De Vlugt | B60G 9/00 280/124.106 |

OTHER PUBLICATIONS

Ninebot One Quick Start Manual, Optional Accessories, 2015.*
Ninebot One Electric Unicycle Training Wheels Accessories for Ninebot One C+ E+. www.banggood.com/Ninebot-One-Electric-Unicicyle-Training-Wheels-Accessories-for-Ninebot-One-C-E-p-996829.html, Sep. 12, 2015.*

(Continued)

*Primary Examiner* — Karen Beck
(74) *Attorney, Agent, or Firm* — Richard Baker

(57) ABSTRACT

A safety accessory for a tilting propulsion device or similar device is described. The safety accessory prevents the tilting propulsion device from pitching the user from the tilting propulsion device when mounting the tilting propulsion device. The accessory is attached to the tilting propulsion device and will come in contact with the ground if the tilting propulsion device pitches forward, stopping movement and allowing the user to regain his balance.

18 Claims, 8 Drawing Sheets

(56) References Cited

OTHER PUBLICATIONS

Iseebiz(R) 1 Pair Training Wheels for Ninebot One C C+ E Electric Scooter Training Wheels Assist Wheels Balancing Unicycle Training Wheels. Amazon.com, Sep. 7, 2016.*
Internet Archive Wayback Machine for Banggood.com Ninebot Electric Unicycle Traning Wheels Accessories Sep. 7, 2016.*
Ninebot, "Ninebot One Unicycle Wheels", Amazon.com, website found at http://www.amazon.com/NinebotOneUnicycleTrainingWheels/dp/B00S67UES2?tag=fitblaboo20, downloaded on Mar. 10, 2016.
Viernes, William, "First ever balance wheel training wheel", YouTube video found at https://www.youtube.com/watch?v=gjuNSJMoUlo, viewed on Mar. 10, 2016.
G, Paul, "Hoverboard fail", YouTube vide found at https://www.youtube.com/watch?v=oFhZ3H1cywE, viewed on Mar. 10, 2016.
Ulanoff, Lance, "I survived a test drive aboard the Swagway X1 'hover board'", Mashable, Sep. 29, 2105.

* cited by examiner

TILTING PROPULSION DEVICE SAFETY MECHANISM

BACKGROUND OF INVENTION

Field of the Invention

The present invention is directed to tilting propulsion devices, and in particular to safety accessories for such devices.

Description of the Related Art

Ever since Shane Chen invented the first motorized tilting propulsion device in 2012 (see U.S. Pat. No. 8,738,278, incorporated herein by reference), users of such devices have been falling off and subject to injury. The problem is particularly acute for new users who have not mastered the technique of operating the motorized tilting propulsion device. The dangers of operating one of these devices, often called "hoverboards," is apparent, as described in "I Survived a Test Drive Aboard the Swagway X1 'Hover board'" by Lance Ulanoff (found at http://mashable.com/2015/09/29/swagway-x1-hoverboard/#qAbf1r7m.Pqi)(visited Mar. 10, 2016).

If the new user does not keep his feet level when mounting the tilting propulsion device, the board will pitch forward or backward, tossing the user to the ground. Also, new users tend to have problems dismounting from the tilting propulsion devices without excessive pitching. Moreover, because new users have not yet mastered the art of tilting the tilting propulsion device during operation, many of them overextend the tilt angle, causing them to fall as well as cause damage to the device and potentially causing injury. Moreover, because the speed of the device is related to the tilt angle, users are often going faster than anticipated when they fall.

In the art, it was known to attach "training wheels" to tiling propulsion devices, similar to what is used on bicycles. Essentially, these are either permanently attached to limit the tilt angle, or have an "extension rod" that must be attached by screws or rivets. They do nothing to slow down the device, but rather limit the tilt angle to help keep the user upright. See, e.g., U.S. Pat. No. 9,126,487, particularly at FIG. 10 and col. 27, and U.S. Pat. No. 7,083,178, particularly at FIGS. 6 and 7 and col. 6.

Particularly for motorized tilting devices, what is needed is a device that can also limit the rate of speed, especially during the learning curve. Preferably, the device could also protect the outer surface of the tilting propulsion device without the need for marring the surface either by scuffing, or through requiring ugly extensions that require screws or rivets to attach to the tilting propulsion device.

BRIEF SUMMARY OF THE INVENTION

The invention of the patent in suit is directed to attachments to or integral parts of a tilting propulsion device to limit its range of motion. In preferred embodiments, the attachments have a surface substantially conformed to the surface of the tilting propulsion device, which allows it to "snap on" or to be attached by, for example, Velcro or straps. In preferred embodiments for motorized tilting devices, the attachment can limit the rate of speed for the motorized tilting device during operation.

An apparatus for limiting the range of motion of a tilting propulsion device made up of one or more parts is described herein where a first portion of the apparatus is substantially conformed to at least one surface of the of the tilting propulsion device; and where a second portion limits the range of motion of the tilting propulsion device by extending from the first portion. The apparatus is attached to the tilting propulsion device with one or more straps, Velcro, or any other adhesive (or the device could be molded into the tilting propulsion device). The range of motion of the apparatus is limited such that the tilting propulsion device will still operate, but at a lower rate of speed than without the apparatus. The second portion of the apparatus has, at an end farthest away from the first portion, a surface designed to prevent skidding or a wheel.

Furthermore, an apparatus for limiting the range of motion of a motorized tilting propulsion device is described here where the rate of speed is at least partially dependent on a tilt angle of one or more portions of the propulsion device, is made up of one or more parts including a first portion designed to attach to the surface of the of the tilting propulsion device; and a second portion that limits the range of motion by extending from the first portion and limits the rate of speed for the tilting propulsion device when attached. The apparatus can be attached to and detached from the tilting propulsion device and conforms to a shape of the motorized tilting propulsion device. The apparatus can be attached to at least one surface of the tilting propulsion device by Velcro or any other adhesive or by one or more straps. The second portion of the apparatus has at an end farthest away from the first portion a surface designed to prevent skidding.

Furthermore, a method for limiting the range of motion of a motorized tilting propulsion device is described where the method provides an accessory to attach to the tilting propulsion device that has a first portion substantially conformed to at least one surface of the tilting propulsion device and provides attachments to attach the tilting propulsion device to the accessory, whereby the accessory has a second portion that extends from the first portion and limits a range of motion of the motorized tilting device when the accessory is attached with the attachments. The accessory in the method limits a range of speed for the motorized tilting device. The second portion of the accessory, farthest from the motorized tilting device has an end designed to prevent skidding or has a wheel. The attachments in the method could include Velcro, straps, and/or adhesives.

DETAILED DESCRIPTION AND BEST MODE OF IMPLEMENTATION

Figure 1:
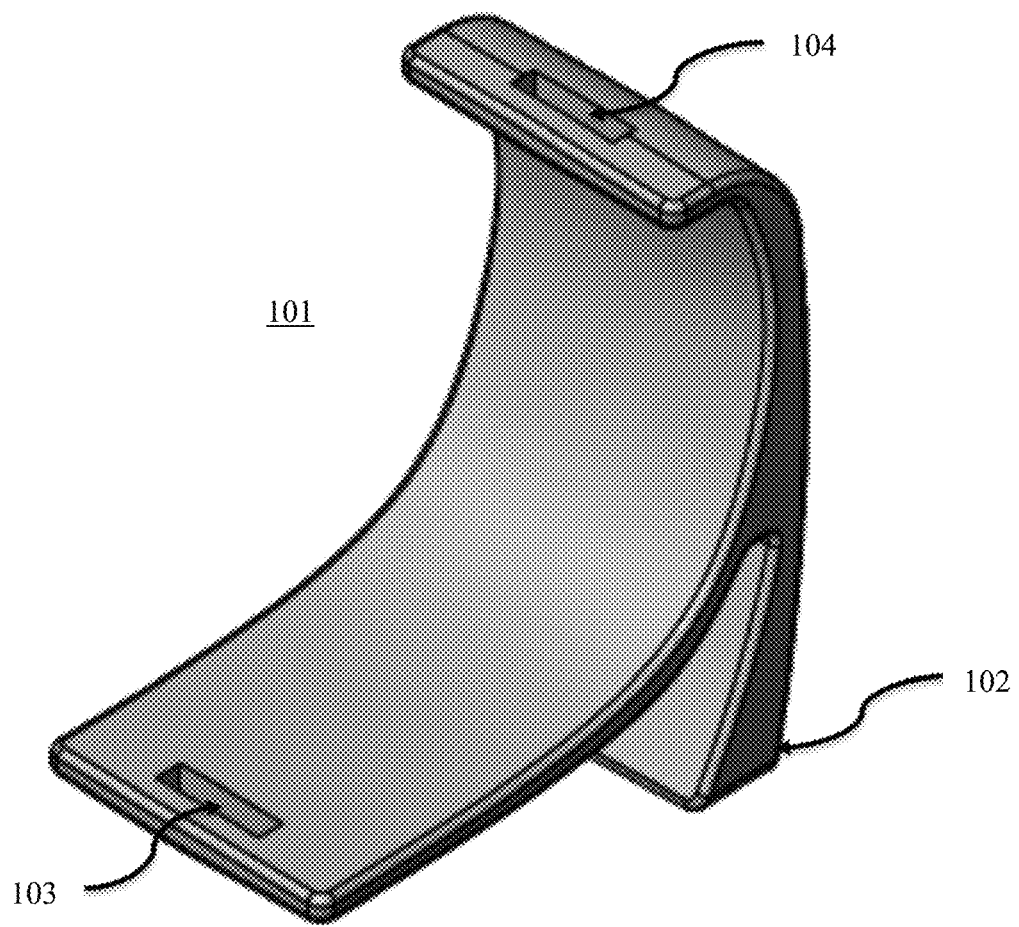
FIG. 1 is a prospective view of the Notilt safety accessory.

Described herein is an accessory for a self-balancing one or two wheeled vehicle, such as a hoverboard, a Segway, a one wheeled skateboard, scooter, or similar device (for simplicity of this application, we will use the word tilting propulsion device for this class of device). The accessory is a safety device that prevents the tilting propulsion device from tipping past a certain angle when mounting or operating the hoverboard by mechanically preventing the tilting propulsion device from pitching forward or backward as a foot is placed on the tilting propulsion device. Preferably, the angle is limited to also limit the speed of the device for new users. Preferably, the device can be removed after the user is "trained" to properly use the device.

A tilting propulsion device is properly mounted by placing one foot as close to the wheel as possible, and keeping the foot level (parallel to the ground). Next, the user steps onto the board with the other foot, again placing the foot as close to the other wheel as possible, and keeping the foot level.

Learning to use a tilting propulsion device can be painful. Until a user gets used to the technique for placing the feet on the tilting propulsion device, there is a tendency to place the feet on the tilting propulsion device without assuring that each foot is parallel to the ground. When the feet are not parallel, the tilting propulsion device will move in the direction of the angle of the foot, often pitching the user off of the tilting propulsion device, potentially causing injury. In addition, the tilting propulsion device is often scratched by failed attempts to mount the tilting propulsion device.

To prevent the board from moving forward at an angle and pitching the user, preferably two Notilt tilting propulsion device accessories are attached to the tilting propulsion device, one on the front left and the other on the back right side of the tilting propulsion device (or on the front right and back left sides). If the user's feet are not level, and the tilting propulsion device starts to pitch forward, the foot of the Notilt will make contact with the ground and stop the tilting propulsion device from moving forward until the user is able to get his balance on the board and make his feet level. This prevents the user from being pitched off of the tilting propulsion device.

In addition to protecting the users when mounting the tilting propulsion device, the Notilt device limits the speed in which the device will move in a forward or backward direction. By limiting the maximum tilt angle in either direction, the speed of the device is limited, as tilting propulsion devices increase speed as the tilt increases.

While typically a pair of Notilt devices are used on a single tilting propulsion device, other embodiments may use only one Notilt. Still another embodiment may use three or four Notilt devices on a single tilting propulsion device.

The Notilt tilting propulsion device accessory 101 preferably can be easily attached to the tilting propulsion device without requiring screws, nails, or rivets, so it can be removed without damage to the tilting propulsion device once the user masters the technique of mounting the tilting propulsion device. The shape of the Notilt is such that at least one surface substantially conforms to the shape of the tilting propulsion device so that it can be attached readily. Preferably, enough of the shape of the Notilt is substantially conformed to that can "snap on." In this embodiment, the shape of the Notilt 101 is such that conforms securely to the tilting propulsion device. It is possible that the shape of the tilting propulsion device could be shaped so as to better allow such Notilt devices to either snap on or snap off, through the use of grooves and the like.

Additional embodiments use Velcro to attach the Notilt device to the tilting propulsion device, through the use of contact Velco patches on both the Notilt device and the tilting propulsion device. A further embodiment uses a strap to attach the Notilt to the tilting propulsion device. In this embodiment, the strap will go through the slot on the top of the Notilt and proceed around the tilting propulsion device to the slot on the bottom of the Notilt. The strap may be secured by Velcro or any other type of fastener known in the art. Other possibilities will be evident to one of skill in the art, such as adhesives (which preferably could be removed from the Notilt device after training).

In a further embodiment, the Notilt device could be an integral part of the tilting propulsion device. Preferably, the Notilt device shape could be cast from a single mold along with the tilting propulsion device.

Turning to FIG. 1, we see a prospective view of one embodiment of the Notilt 101 device. The device is a rectangular piece of material roughly 60 mm wide, 160 mm long, and 6 mm thick, curved in a semi-circular shape along the long side, the semi-circular shape covering about one quarter of a circle. The bottom section of the semi-circle extends almost flat for the about 70 mm. The exact shape of the curve may be set to substantially conform to the shape of the side of a tilting propulsion device. On the outside of the semicircle, a foot 102 extends from about halfway around the circle to a point about 22 mm below the semi-circle. The foot 102 is about 15 mm at the point where it departs from the semi-circle and expands to about 20 mm at the lower portion, expanding uniformly. At the top of the semicircle, a top slot 104 is cut in the rectangular piece about 5 mm from the end. The slot 104 is about 5 mm wide and 23 mm long. It has the same dimensions and is also located 5 mm from the end. While the dimensions herein describe the preferred embodiment, other embodiments could use other dimensions without departing from the invention herein. For instance, the rectangular piece of material could be as wide as the tilting propulsion device. In another embodiment, the rectangular piece could be make of a strong material and very narrow in width.

The device is built of a plastic material such as Nitrile Butadiene Rubber (NBR), polyethene, polypropene, NBR in combination with polypropene, phenolic-cotton composites, and other similar materials. Other materials could be used as well, such as wood, metal (steel, aluminum, iron, brass, etc.), cork, rubber, stone, resin, fiberglass, and the like. In the preferred embodiment, the Notilt device is manufactured by injection molding, although the Notilt could be manufactured by machining material or through an additive material process such as 3D printing.

Figure 2:
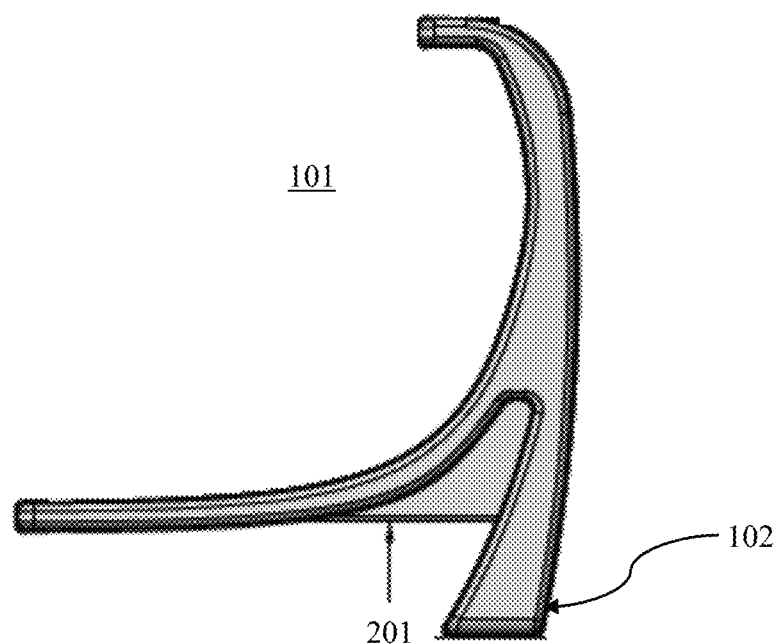
FIG. 2 is a side view of the Notilt safety accessory.

In FIG. 2, a side view of one embodiment of the Notilt 101 device is shown. This view shows a representative view of the semi-circular curve of the rectangle, shaped to conform to a tilting propulsion device. This view also shows the shape for the foot 102. The side view also shows a support 201 that connects the foot 102 to the semi-circle, providing additional structure to keep the foot from breaking off of the Notilt 101. This support 201 is roughly 10 mm wide and about 45 mm long.

The foot 102 is a solid piece of plastic in this embodiment, but could be made of one or more pieces that assemble together (or of other materials). In another embodiment, the foot 102 could have a wheel attached at the point where the foot would hit the ground, to allow the Notilt 101 to roll when in contact with the ground. In another embodiment, the foot 102 could have a covering of a slippery material so that the foot will slide across the ground when in contact with the ground. It is possible that foot 102 might be made of materials that wear away over time, so that the device does not harm the surface. It is also possible that foot 102 might be "notched" or otherwise designed to fail after certain thresholds of pressure are met.

Figure 3:
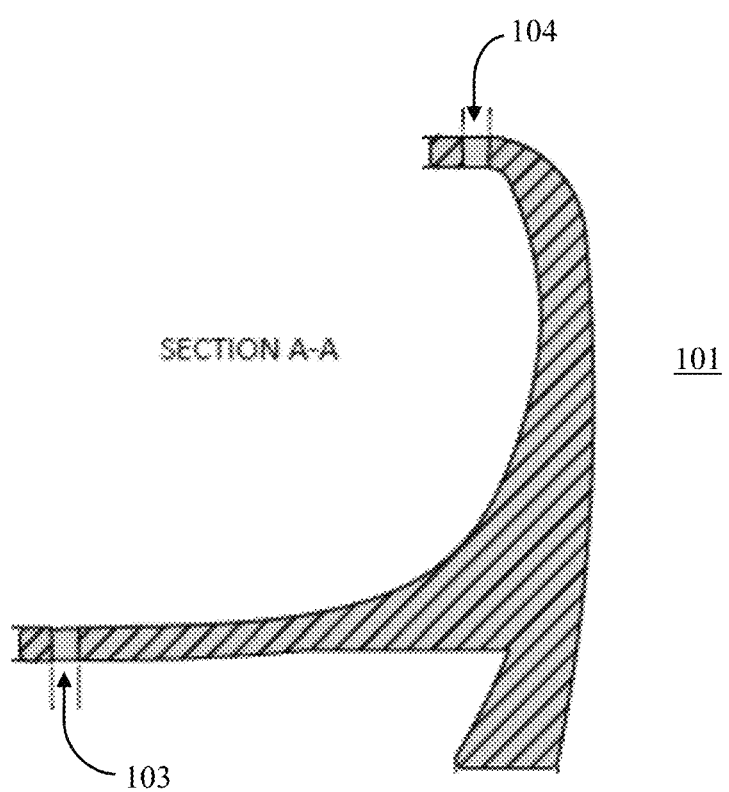
FIG. 3 is a cut-away view of the Notilt safety accessory.

FIG. 3 shows a cut away view of one embodiment the Notilt 101 at the mid-point of the width of the device. Top slot 104 is cut into the top end of the semi-circle about 5 mm from the end. Bottom slot 103 is cut into the bottom end of the semi-circle about 5 mm from the end. In the Velcro or strap embodiments, a strap is inserted into the top slot 104 and a strap is run around the tilting propulsion device to the bottom slot 103. In other embodiments, slots could be used in conjunction with raised features on a tilting propulsion device to snap on the Notilt 101 onto the surface of the tilting propulsion device.

Figure 4:
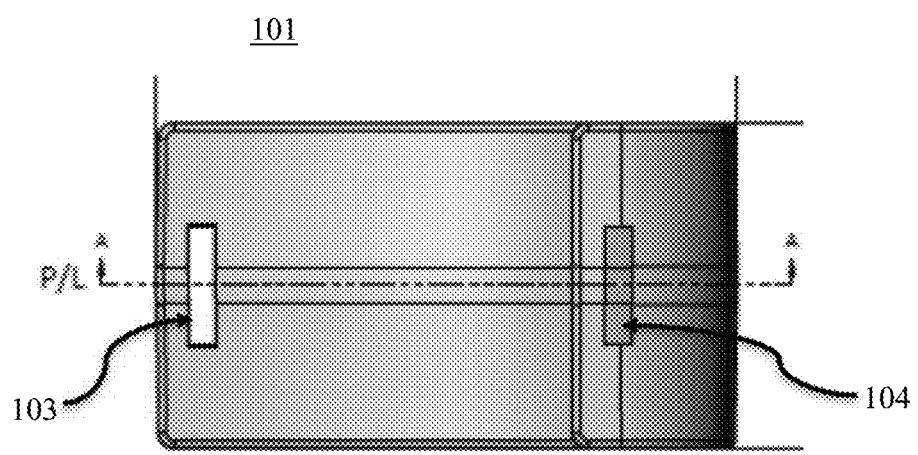
FIG. 4 is a top view of the Notilt safety accessory.

FIG. 4 is the top view of one embodiment of the Notilt 101. This view shows where the top slot 104 and bottom slot 103 are located. The markings showing where the cut-away view (FIG. 3) can be seen at the A line.

Figure 5:
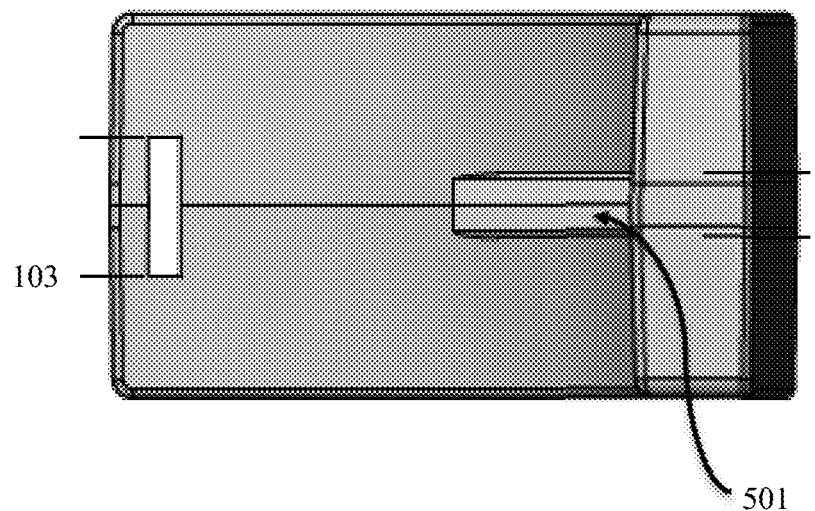
FIG. 5 is a bottom view of the Notilt safety accessory.

FIG. 5 is a bottom view of one embodiment of the Notilt 101. The foot 102 can be seen in this drawing as can the support 501. The support is about 10 mm thick, and runs to almost to the mid-point in the Notilt.

Figure 6:
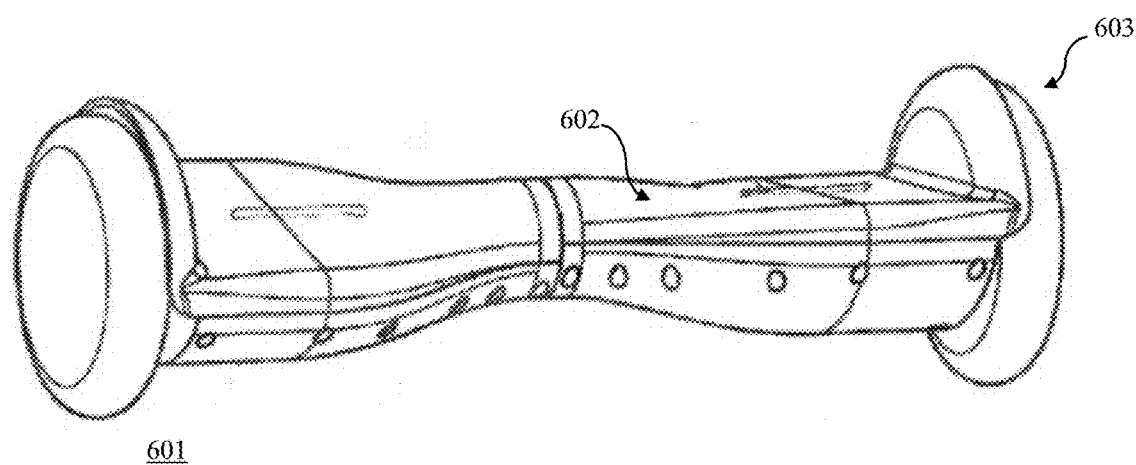
FIG. 6 is a drawing of a tilting propulsion device.

In FIG. 6 we see a diagram of a tilting propulsion device 601 from U.S. Pat. No. 8,738,278. The tilting propulsion device 601 is seen with wheels 603 and treads 602. When using the tilting propulsion device 601, the user places his feet on the treads 602. The tilting propulsion device 601 rotates the wheels 603 to keep the treads 602 flat if the user keeps the treads 602 level. If the user tilts the tread 602 forward, the wheel 603 will move forward to move the tilting propulsion device forward. The treads and wheels are independent, and one wheel can rotate forward and the other backward if the treads are tilted in opposite directions.

In the embodiment shown in FIG. 6 the tilting propulsion device 601 is a two-wheel, self-balancing vehicle with independently movable platform. Tilting propulsion device 601 may have a first and a second platform section. Each platform section may include a housing formed of a bottom housing member and a top housing member. The top housing members may have a foot placement section 602 or area formed integrally therewith or affixed thereon. The foot placement section 602 is preferably of sufficient size to receive the foot of a user and may include a tread or the like for traction and/or comfort. Each platform section includes a wheel 603, and each wheel preferably has an axle and motorized hub assembly. The two platform sections are movably coupled to one another. There is a shaft about which they may rotate (or pivot with respect to one another). The tilting propulsion device 601 may operate software that make the device self-leveling when the foot placement sections 602 are level and propel the wheels 603 in the direction of tilt when the foot placement sections 602 are tilted. More information on the functionality of the tilting propulsion device 601 can be found in U.S. Pat. No. 8,738,278, incorporated herein by reference.

Figure 7:
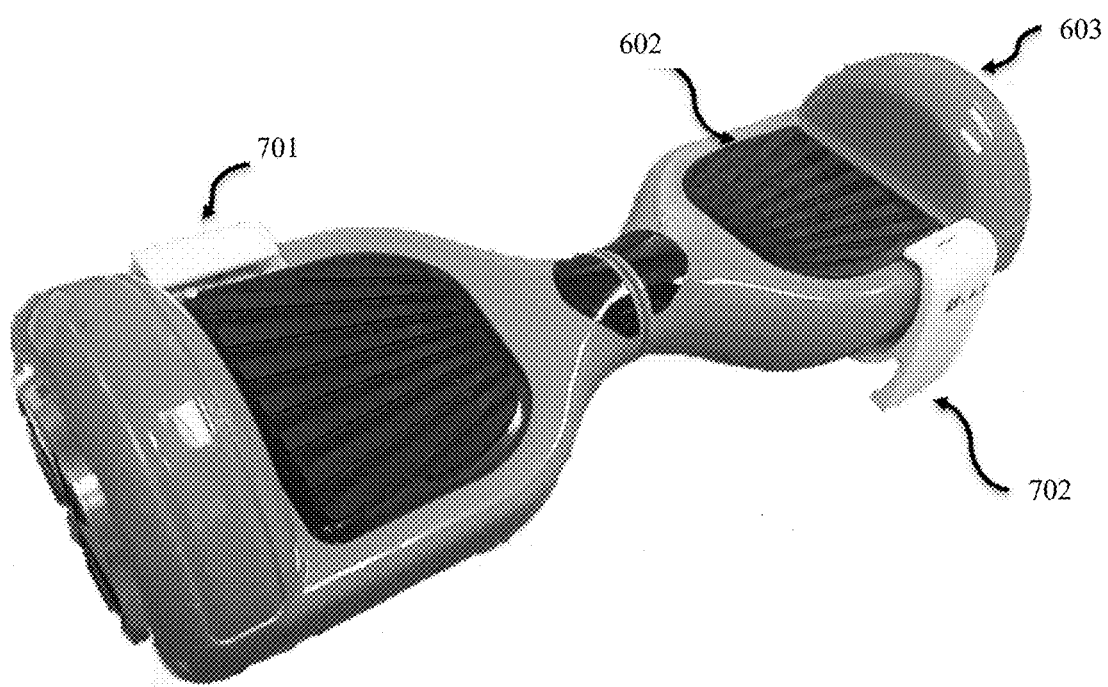
FIG. 7 is a photograph of the tilting propulsion device with the Notilt installed.

FIG. 7 shows the tilting propulsion device with one embodiment of two Notilt devices 701 and 702 installed. The left Notilt 701 is on the front of the tilting propulsion device 601 and the right Notilt 702 is on the back of the device. In this photograph, the left tread is tilted backwards and the Notilt 701 is in the air. The right tread 602, is level, and the right Notilt 702 is slightly off the ground. Should the user tilt the right tread 602 backwards to any significant degree, the foot of the right Notilt 702 will hit the ground and prevent the tilting propulsion device 601 from over rotating and prevent the tilting propulsion device 601 from moving backwards. This will give the user a chance to catch is balance, and prevent falling.

Notilt units described above are mounted on one side of a tilting propulsion device. In other embodiments, a Notilt with two feet, one for the front and one for the back, could be designed to snap on the entire underside of the tilting propulsion device.

Figure 8:
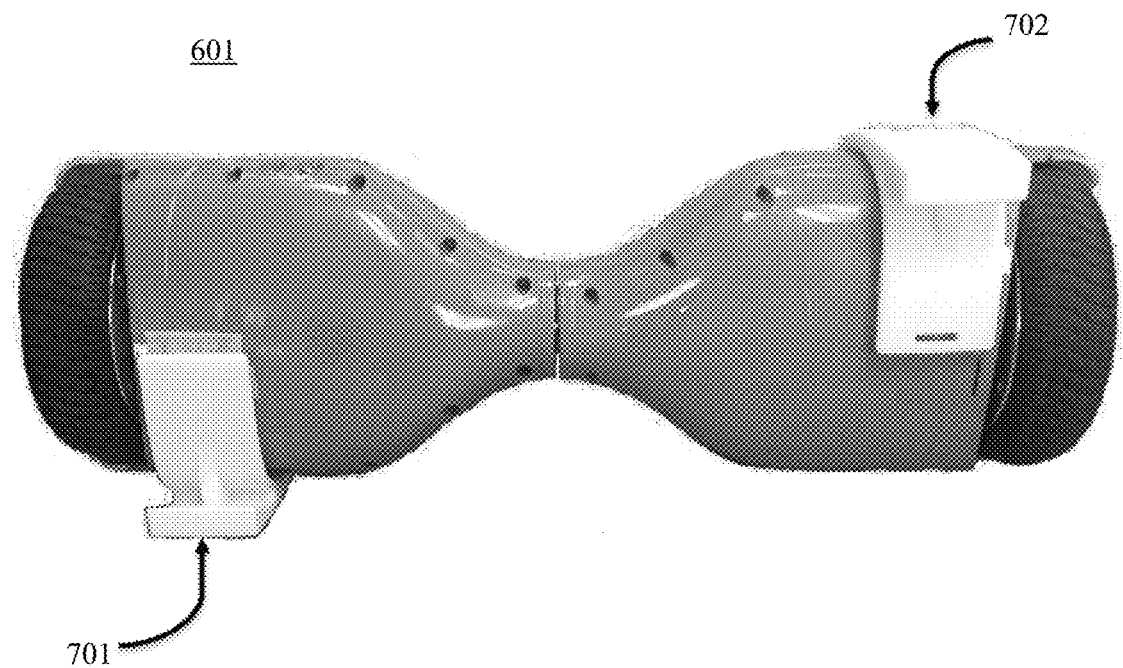
FIG. 8 is a photograph of a pair of Notilt safety accessory devices attached to a tilting propulsion device.

FIG. 8 is a photograph of a tilting propulsion device 601 from the undersides with one embodiment of two Notilt 701, 702 devices attached. The Notilt 701 on the left side is attached with Velcro and the Notilt 702 on the right is snapped on. The position of each device is on the main base of the tilting propulsion device 601 as far to the outside of the device as possible, as is the preferred location of the device. However, in alternative embodiments, the Notilt 701, 702 could be positioned anywhere on the device. In still another embodiment, the Notilt 701, 702 device could be molded into, and made an integral part of, the tilting propulsion device 601, or its housing.

In addition to the Notilt device, the tilting propulsion device could have bumpers mounted around the edge to prevent scuffing as the device is used. These bumpers could be build out of a soft material that will flex before causing damage to either the tilting propulsion device or to items that the tilting propulsion device runs into. These bumpers would be attached with either adhesive or Velcro or similar technology to the outer edges of the tilting propulsion device (or molded into the tilting propulsion device), and may attach on all edges or a subset of the outer edges. The bumpers could also be molding into, and made an integral part of, the titling propulsion device 601, or its housing. It is also possible that the bumpers could be integrated into the Notilt device.

The above description of the embodiments, alternative embodiments, and specific examples, are given by way of illustration and should not be viewed as limiting. Further, many changes and modifications within the scope of the present embodiments may be made without departing from the spirit thereof, and the present invention includes such changes and modifications.

We claim:

1. An apparatus for limiting a range of motion of a tilting propulsion device made up of one or more parts comprising
    a first portion substantially conformed to at least one surface of the tilting propulsion device; and
    a second portion that limits the range of motion of the tilting propulsion device by extending from the first portion,
    where the range of motion is limited such that the tilting propulsion device will still operate, but at a lower rate of speed than without the apparatus.

2. The apparatus of claim 1, where the apparatus can be attached to and detached from the tilting propulsion device.

3. The apparatus of claim 2, where the first portion can be attached to at least one surface of the tilting propulsion device by an adhesive or straps.

4. The apparatus of claim 2, where the first portion is substantially conformed to at least one surface of the tilting propulsion device such that the apparatus snaps on to the tilting propulsion device.

5. The apparatus of claim 1, where the second portion has at an end farthest away from the first portion a surface designed to prevent skidding.

6. The apparatus of claim 1, where the second portion has at an end farthest away from the first portion has a wheel.

7. An apparatus for limiting a range of motion of a motorized tilting propulsion device where a rate of speed is at least partially dependent on a tilt angle of one or more portions of the tilting propulsion device, made up of one or more parts comprising,
    a first portion designed to attach to a surface of the of the tilting propulsion device; and
    a second portion that limits the range of motion by extending from the first portion and limits the rate of speed for the tilting propulsion device when attached.

8. The apparatus of claim 7, where the apparatus can be attached to and detached from the tilting propulsion device.

9. The apparatus of claim 8, where the first portion is substantially conformed to a shape of the motorized tilting propulsion device.

10. The apparatus of claim 9, where the first portion can be attached to at least one surface of the tilting propulsion device by or one or more straps.

11. The apparatus of claim 9, where the first portion of the apparatus substantially conforms to an outer surface of the tilting propulsion device such that the apparatus can snap on to the tilting propulsion device.

12. The apparatus of claim 7, where the second portion has at an end farthest away from the first portion a surface designed to prevent skidding.

13. An method for limiting a range of motion of a motorized tilting propulsion device comprising
providing an accessory to attach to the tilting propulsion device that has a first portion substantially conformed to at least one surface of the tilting propulsion device;
providing attachments to attach the tilting propulsion device to the accessory;
whereby the accessory has a second portion that extends from the first portion and limits a range of motion of the motorized tilting device when the accessory is attached with the attachments,
whereby the accessory limits a range of speed for the motorized tilting device.

14. The method of claim 13, whereby the second portion of the accessory farthest from the motorized tilting device has an end designed to prevent skidding.

15. The method of claim 13, whereby the second portion of the accessory farthest from the motorized tilting device has a wheel.

16. The method of claim 13, whereby the attachments include an adhesive.

17. The method of claim 13, whereby the attachments include straps.

18. The method of claim 13, whereby the attachments include adhesives.

* * * * *